UNITED STATES PATENT OFFICE.

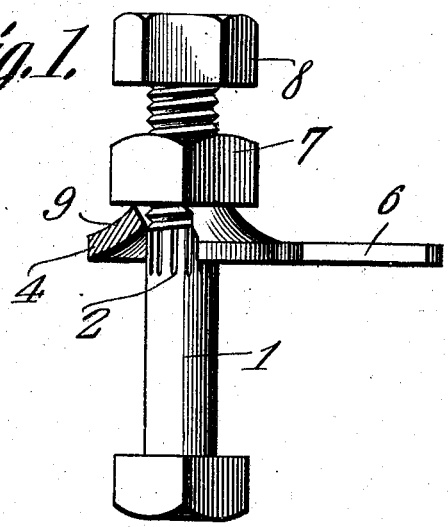
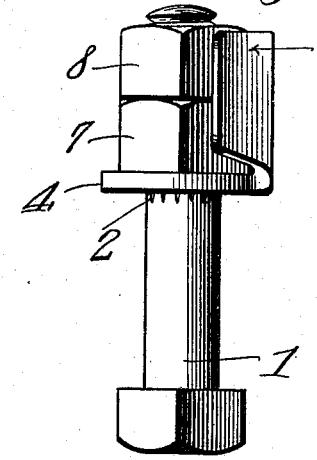
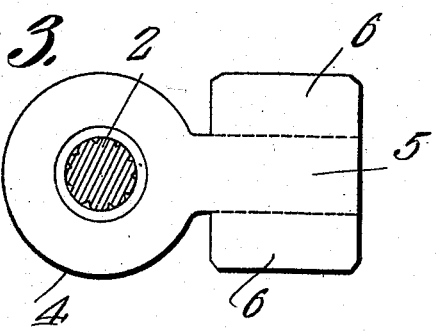
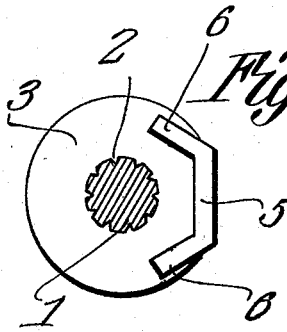
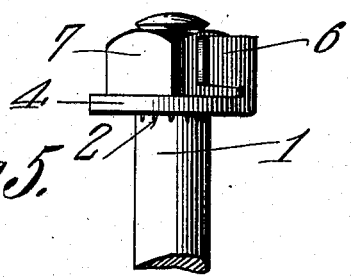

BERT HUMPHREY, OF CHARLESTON, WEST VIRGINIA.

NUT-LOCK.

No. 924,467.     Specification of Letters Patent.     Patented June 8, 1909.

Application filed October 7, 1908. Serial No. 456,526.

*To all whom it may concern:*

Be it known that I, BERT HUMPHREY, a citizen of the United States, residing at Charleston, in the county of Kanawha and State of West Virginia, have invented a new and useful Nut-Lock, of which the following is a specification.

The objects of the invention are, the provision in a merchantable form, of a device of the class above mentioned, which shall be inexpensive to manufacture, facile in operation, and devoid of complicated parts; the provision of a locking washer, of novel and improved type; the provision of novel means for attaching the locking washer to the bolt; other and further objects being made manifest hereinafter, as the description of the invention progresses.

The invention consists in the novel construction and arrangement of parts hereinafter described, delineated in the accompanying drawings, and particularly pointed out in the appended claim, it being understood that divers changes in the form, proportions, size and minor details of the structure may be made, without departing from the spirit or sacrificing any of the advantages of the invention.

Similar numerals of reference are employed to denote corresponding parts throughout the several figures of the drawings.

In the accompanying drawings: Figure 1 is a side elevation of my invention previous to locking the nut, a portion of the washer 3 being broken away; Fig. 2 is a side elevation of the nuts 7 and 8 being locked in place; Fig. 3 is a top plan of the washer 3 previous to locking, the bolt 1 being shown in transverse section; Fig. 4 is a top plan of the washer 3 upturned into locking position, the bolt 1 being shown in transverse section; Fig. 5 shows, in side elevation, a modified form of my invention.

In the accompanying drawings, the numeral 1 denotes a bolt of the usual form. The bolt 1 is threaded in the usual manner, and below the threaded portion, are disposed a plurality of longitudinally disposed slits 2. A locking washer 3 is provided, arranged to fit upon the bolt 1, comprising a body portion 4, which is cup-shaped in form. A wing 5 projects radially from the cup shaped body portion 4, and this wing 5 is provided with oppositely disposed arms 6, arranged to be turned inward into locking relation with the nut, as will be hereinafter described.

The locking washer 3, is of soft metal, and its application and operation are as follows:—When the nut 7 is turned down upon the bolt 1, it will engage the upper portion 9 of the cup-shaped locking washer 3, and force the same downward into the slits 2, the friction between the nut 7 and the locking washer 3 serving to heat the soft metal locking washer and to cause it more readily to enter and engage the slits 2.

If desired, a single nut 7 may be employed, or another, superposed nut, 8, may be added. When one or both of these nuts are turned down to a firm seat upon the locking washer 3, the wing 5 is upturned against the said nuts, and the arms 6 are inwardly turned against them.

Compared with the wing 5, the body portion 4 of the locking washer 3 is made relatively thick as shown, in order that a part of the said body portion may extend down upon the slits 2 and engage the same when the nut 7 is not at the limit of its travel; the washer being of soft metal, this added thickness of the body portion does not interfere with the flattening of the cup-shaped member. It is not necessary however, that the washer 3 be in engagement with the slits 2, for the washer will grasp the threads of the bolt and hold against rotation, or will hold on a smooth surface, in fact.

In Fig. 5 of the drawings, I have shown a modified form of my invention. In this instance, the superposed nut 8, shown in Fig. 1, is omitted, and the shorter dimensions of the members 5 and 6 of Fig. 3 are decreased, in order that no portion of them may upstand above the surface of the nut 7. It is obvious, that the application and operation of the modified form of my invention is similar to the operation and application of the preferred form shown in Figs. 1, 2, 3 and 4.

Having thus described my invention, what I claim as new, and desire to protect, by Letters Patent, is:—

In a device of the class described, a bolt having a plurality of longitudinally disposed slits upon its surface below the threaded portion; a locking washer comprising a cup-shaped body portion arranged to be flattened by the pressure of a nut and forced into the slits; a wing projecting radially from the body portion; oppositely disposed arms projecting laterally from the wing, the wing being arranged to be upturned into locking relation with a nut, and the arms arranged to be bent inward upon the nut.

In testimony that I claim the foregoing as my own, I have hereto affixed my signature in the presence of two witnesses.

BERT HUMPHREY.

Witnesses:
CATHRYN HARRIS,
J. R. JONES.